United States Patent [19]
Bawin et al.

[11] Patent Number: 5,512,792
[45] Date of Patent: Apr. 30, 1996

[54] ELECTRIC MOTOR WITH HIGH POWER AND HIGH ROTATIONAL SPEED

[76] Inventors: Pierre Bawin, 3 Avenue de la Paix, B-6032 Mont/sur/Marchiene; Roland Botte, 28 Avenue des Gaulx, B-6180 Courcelle; Jean-Marie Edebouw, 5 Loripette, B-6120 Marbaix-la-Tour; Dominique Gilon, 31 Avenue Heures Claires, B-1410 Waterloo, all of Belgium

[21] Appl. No.: 191,422

[22] Filed: Feb. 3, 1994

[30] Foreign Application Priority Data

Feb. 5, 1993 [EP] European Pat. Off. .............. 93870023
May 11, 1993 [EP] European Pat. Off. .............. 93870078

[51] Int. Cl.⁶ ....................................................... H02K 1/22
[52] U.S. Cl. ................................... 310/262; 310/211
[58] Field of Search ........................... 310/262, 261, 310/211, 212, 216, 217, 264; 464/179, 182

[56] References Cited

U.S. PATENT DOCUMENTS

| | | | |
|---|---|---|---|
| 1,823,337 | 9/1931 | Sheely | 310/211 |
| 1,941,038 | 12/1933 | Ljungstrom | 310/261 |
| 3,902,087 | 8/1975 | Hakamada | 310/211 |
| 4,490,638 | 12/1984 | Lind | 310/211 |

FOREIGN PATENT DOCUMENTS

| | | |
|---|---|---|
| 0230983 | 1/1960 | Australia . |
| 0695255 | 9/1964 | Canada . |
| 0343313 | 11/1989 | European Pat. Off. . |
| 0509119 | 10/1992 | European Pat. Off. . |
| 0548733 | 6/1993 | European Pat. Off. . |
| 578782 | 6/1933 | Germany . |
| 603312 | 9/1934 | Germany . |
| 678780 | 7/1939 | Germany . |
| 905044 | 2/1954 | Germany . |

*Primary Examiner*—R. Skudy

[57] ABSTRACT

The present invention relates to an electric motor with high power and high rotational speed consisting of a stator and of a rotor, in which the rotor comprises a laminated magnetic mass (1) consisting of a stack of armature core disk laminations (11) and a squirrel cage consisting of two short circuiting rings (2) located on either side of the laminated magnetic mass (1) and of a plurality of bars (3) joining the two short circuiting rings (2) together and which are distributed uniformly at the periphery of the magnetic mass (1), this rotor being one wherein the armature core disk laminations (11) do not have a central hole.

19 Claims, 1 Drawing Sheet

ELECTRIC MOTOR WITH HIGH POWER AND HIGH ROTATIONAL SPEED

FIELD OF THE INVENTION

The present invention relates to a high power electric motor which is intended to operate at very high rotational speeds. More particularly this invention is directed to improvements in a rotor of such an electric motor, particularly an asynchronous motor.

DESCRIPTION OF THE PRIOR ART

There is currently a need to for powerful electric motors which can operate at a high rotational speed, namely of the order of 10,000 rpm and more.

Recent improvements made in semiconductors constituting power electronics currently make it possible to control variable-frequency high power asynchronous motors and, particularly therefore to regulate rotational speed of the asynchronous motors which may consume power on the order of several megawatts.

The design of high power motors with rotational speeds of the abovementioned order of magnitude presents mechanical difficulties, particularly as regards the mechanical strength of the moving parts of these machines, i.e., the rotor.

In a rotor of conventional construction, a laminated magnetic mass consisting of a stack of clamped apertured armature shaft which is coaxial with and extends through the rotor.

With this configuration, the armature core disk laminations constituting the magnetic mass have a central hole intended for the passage of the rotation shaft and therefore are subject to stresses at the edge of the central hole both during formation of the hole and subsequently under the action of centrifugal force when the rotor rotates.

The squirrel cage of the rotor, for its part, conventionally consists of two short circuiting rings located on either side of the magnetic mass and joined together by bars distributed uniformly about the periphery of said magnetic mass.

Document DE-C-603,312 describes a rotor for an electric machine which does not have a squirrel cage (rings plus bars) and which consequently seems not to be able to be used in asynchronous machines. This document describes that the assembly of the plates for clamping to the shaft is carried out by welding ribs. This assembly technique is not suitable for high speed machines owing to its lack of strength.

Document DE-C-905,044 describes an embodiment of a rotor for an electric motor in which the rings of the squirrel cage are outside the shaft ends thereby allowing a certain stiffness to be given to the rotor and a certain behavior to be given to the rings. In this case, it is the cage, formed from aluminum, which allows the rotor to be held. This arrangement is totally inapplicable to high speed machines.

Likewise, document EP-A-509,119 describes an arrangement of a rotor in which the rings are outside the shaft ends. What is more, the armature core disk laminations have holes in them. For these two reasons, this arrangement is inapplicable to high speed machines.

Finally, document DE-C-678,780 describes a solid rotor with a shaft to which laminated teeth are attached.

OBJECTS OF THE PRESENT INVENTION

The present invention provides an electric motor capable of developing high power and high rotational speed which does not exhibit the above-briefly discussed drawbacks of the prior art.

In particular, the present invention aims to propose an electric motor which has a higher peripheral speed and a particularly high natural frequency.

Other objects and advantages will emerge in the description which follows.

SUMMARY OF THE INVENTION

The present invention relates to an electric motor with high power and high rotational speed capability, the motor having a stator and a novel rotor. This novel rotor, as is conventional, comprises a laminated magnetic mass consisting of a stack of armature core disk laminations and a squirrel cage, the squirrel cage consisting of short circuiting rings located on either side of the laminated magnetic mass and of a plurality of bars joining the two short circuiting rings together, these bars being uniformly distributed at the periphery of the magnetic mass. In contra-distinction to the prior art the armature core disk laminations of the rotor of the present invention do not have a central hole through which a rotation shaft passes.

The rotor of the invention also comprises, on either side of the combined magnetic mass and short circuiting rings, two attached shaft ends supporting the bearings.

It has been observed that, advantageously it is no longer a necessary requirement to produce these shaft ends from the same material as the magnetic mass.

The rotor of the invention furthermore comprises tie rods for integrating the various parts constituting the rotor.

DETAILED DESCRIPTION OF THE DISCLOSED EMBODIMENT

Figure 1:
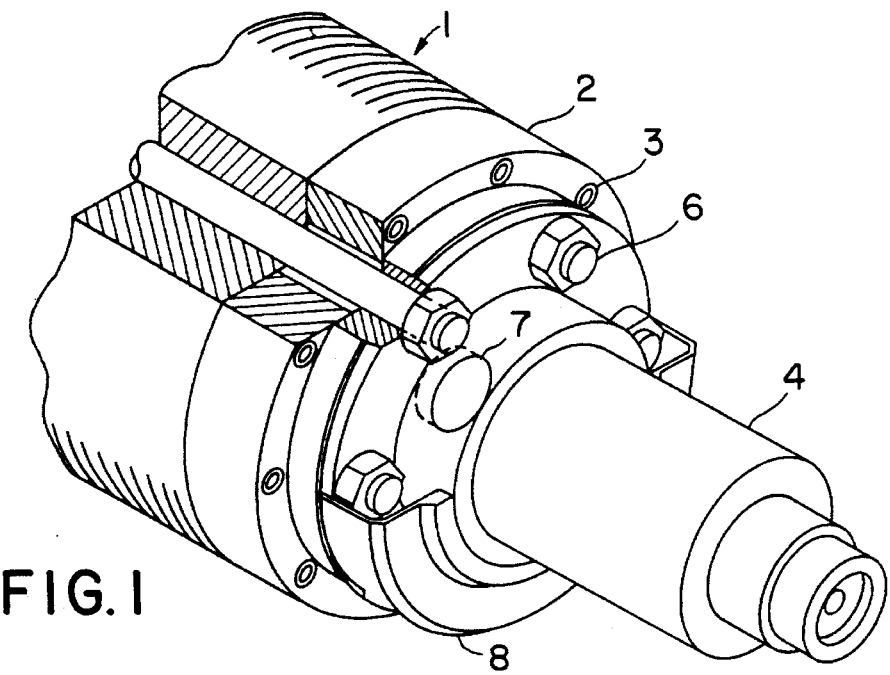
FIG. 1 is a perspective view, partly broken away of a rotor according to the present invention.
Figure 2:
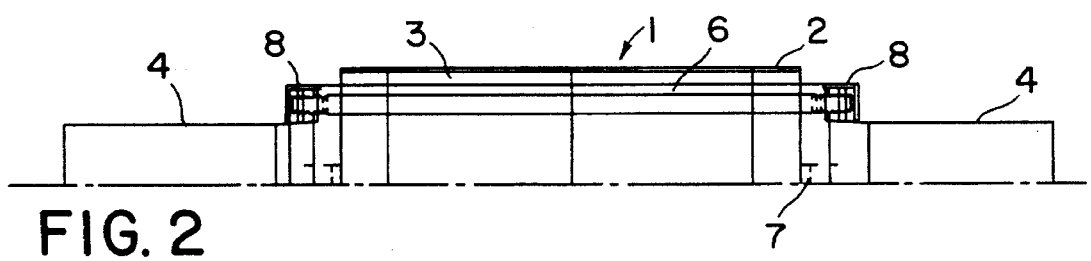
FIG. 2 is a partial side view, in section taken along the axis of rotation of a rotor according to the present invention.

FIGS. 1 and 2 respectively represent a view in perspective and a view in a section along the axis of a rotor for an asynchronous motor which can reach very high speeds. In the interest of facilitating understanding of the invention, the stator of the motor, which may be of conventional design, has not been shown in the drawing.

The rotor essentially comprises a laminated magnetic mass, indicated generally at (1) and a squirrel cage. The magnetic mass (1) consists of a stack of armature core disk laminations (11) one of which may be seen from FIG. 3.

The squirrel cage consists of two short circuiting rings (2) joined together by a plurality of bars (3) distributed uniformly at the periphery of the magnetic mass (1). The short circuiting rings and the bars are produced from a material with high mechanical strength and low electrical resistivity, generally from copper alloy.

Figure 3:
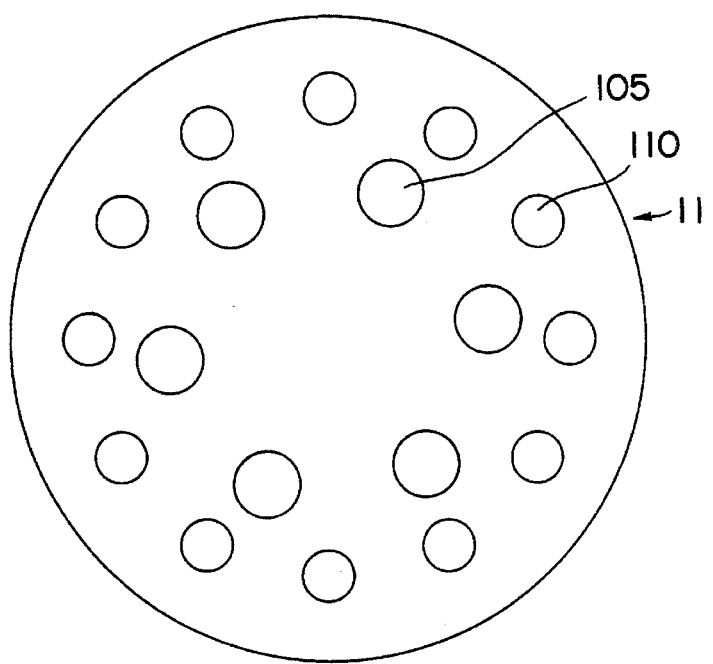
FIG. 3 is a front elevational view of an armature core disk lamination of the magnetic mass of a rotor according to the present invention, FIG. 2 being taken transversely with respect to the axis of rotation of the rotor.

As represented in FIG. 3, the armature core disk laminations (11) constituting the magnetic mass (1) of the rotor do not have a central hole. This advantageously makes it possible to decrease the mechanical stresses to which the armature core disk laminations are subjected as a result of centrifugal forces during high speed operation.

The transverse stiffness of the armature core disk laminations (11) is provided by centering the magnetic mass (1) on tie rods (6). The stack of armature core disk laminations (11) then looks like a cylinder the longitudinal stability of which is produced when the rotor is assembled by exerting a measured tensile force on each of the tie rods.

Consequently, these armature core disk laminations (11) solely have openings (105) intended for the passage of the tie rods (6) and openings (110) intended for the passage of the bars (3) and no longer have a central hole.

Furthermore, the rotor according to the present invention has two attached shaft ends (4) which define coaxial studs or axles by which the rotor is supported for rotation on bearings (not represented). These shaft ends are located at the lateral ends of the magnetic mass (1).

According to a preferred embodiment of the invention, the attached shaft ends (4) are produced from a material different from that of the magnetic mass. By way of non-limiting example, the shaft ends can be produced from a non-magnetic material for the purpose more particularly of avoiding leakage fields, or from a material which cannot be oxidized in the case of a use in a particularly corrosive environment. Sheathed or unsheathed ceramic materials can equally well be envisaged for specific applications such as operation at high temperature.

The rotor is assembled as follows: the armature core disk laminations (11) which will make up the magnetic mass (1) are located on the tie rods (6), and then the short circuiting rings (2) are located on either side of said magnetic mass (1), which short circuiting rings, as well as the shaft ends (4), are fixed. As already mentioned previously, the stack of armature core disk laminations (11) will be stabilized by exerting a measured tensile force on each of the tie rods (6). Likewise, the concentricity of the magnetic mass (1) with the shaft ends (4) is achieved by centering the latter on the same tie rods (6).

The short circuiting rings (2) are, on the other hand, mounted with clearance with respect to the tie rods (6); that is to say that the openings in the rings (2) through which the tie rods (6) pass are slightly greater than the diameter of these tie rods (see FIG. 1) so that the tie rods can expand circumferentially independently of the magnetic mass (1).

The concentricity of the short circuiting rings (2) with respect to the other components is then achieved with the aid of an insert (7) which is inserted in the shaft ends (4). Then these shaft ends can be machined and finished off in order to receive the bearings. Next, a cap (8) is located to cover the ends of the tie rods (6) in order to decrease the windage losses.

The cap may equally well be produced using materials similar to those used for producing the shaft ends, this being for the same reasons.

A motor according to the present invention exhibits the following advantages:

1) the peripheral speed is higher owing to the absence of the rotation shaft which makes it possible to manufacture armature core disk laminations (11) which do not have a central hole;

2) the natural frequency is particularly high owing to the fact that the tie rods (6) play a part in the inertia of the machine, thus giving high bending inertia;

3) there is a slight transverse interdependence of the short circuiting rings (2), the bars (3) and the magnetic mass (1) allowing each one of the various parts which make up the rotor to expand freely independently of one another;

4) the overall structure of the rotor makes it possible to obtain great longitudinal compactness owing to the elastic reserve located in the tie rods (6);

5) the structure of the rotor makes it possible to select the materials used for the shaft ends and the cap in order to produce a rotating part subjected to specific environmental constraints: absence of leakage fields, high corrosion, high temperature . . .

6) finally, the overall aerodynamic shape of the rotor according to the present invention makes it possible to obtain a decrease in the energy losses due to ventilation.

We claim:

1. For use in a high speed asynchronous electric motor, the motor including a rotor and a stator, an improved rotor comprising:

a laminated magnetic mass having first and second ends, said magnetic mass comprising a stack of armature core disk laminations, said core disk laminations each having a solid central portion which extends along and about an axis of rotation of the rotor;

a squirrel cage comprising two short circuiting rings, one of said short circuiting rings being located at either end of said magnetic mass; and a plurality of bars joining said short circuiting rings together, said bars being uniformly distributed relative to said magnetic mass.

2. The rotor of claim 1 further comprising two shaft ends, said magnetic mass and said short circuiting rings being disposed between said shaft ends.

3. The rotor of claim 2 wherein said shaft ends are comprised of a material which is different from that from which said disk laminations are fabricated.

4. The rotor of claim 3 wherein said shaft ends are comprised of a material selected from the group consisting of one of a non-magnetic material, a material which cannot be oxidized, and a ceramic material.

5. The rotor of claim 4 further comprising a plurality of tie rods, said tie rods integrating said magnetic mass, short circuiting rings and shaft ends into a unitary structure.

6. The rotor of claim 5 wherein said armature core disk laminations define a plurality of apertures for receiving said tie rods and said bars.

7. The rotor of claim 6 wherein said short circuiting rings each define a plurality of ring apertures for receiving said tie rods, said ring apertures each having a diameter that is slightly greater than the diameter of said tie rods.

8. The rotor of claim 2 further comprising means for positioning said short circuiting rings in concentric relationship with respect to said magnetic mass and said shaft ends.

9. The rotor of claim 3 further comprising a plurality of tie rods, said tie rods integrating said magnetic mass, short circuiting rings and and shaft ends into a unitary structure.

10. The rotor of claim 9 wherein said armature core disk laminations define a plurality of apertures for receiving said tie rods and said bars.

11. The rotor of claim 10 wherein said short circuiting rings each define a plurality of ring apertures for receiving said tie rods, said ring apertures each having a diameter that is slightly greater than the diameter of said tie rods.

12. The rotor of claim 9 wherein said short circuiting rings each define a plurality of ring apertures for receiving said tie rods said ring apertures each having a diameter that is slightly greater than the diameter of said tie rods.

13. The rotor of claim 12 wherein said tie rods have oppositely disposed ends, and wherein said rotor further comprises cap means located to cover said ends of said tie rods.

14. The rotor of claim 9 wherein said tie rods have oppositely disposed ends, and wherein said rotor further comprises cap means located to cover said ends of said tie rods.

15. For use in a high speed asynchronous electric motor, the motor including a rotor and a stator, an improved rotor comprising:

a laminated magnetic mass having first and second ends, said magnetic mass comprising a stack of armature core disk laminations, said core disk laminations each having a solid central portion which extends along and about the axis of rotation of the rotor;

a squirrel cage comprising short circuiting rings, one of said short circuiting rings being located at either end of said magnetic mass;

a plurality of bars joining said short circuiting rings together, said bars being uniformly distributed with respect to said magnetic mass;

a pair of shaft ends, said magnetic mass and said short circuiting rings being disposed between said shaft ends, said shaft ends defining coaxial axles whereby said rotor may be rotatably supported; and a plurality of tie rods, said tie rods extending through said magnetic mass, short circuiting rings and shaft ends to integrate said magnetic mass, short circuiting rings and shaft ends into a unitary structure.

16. The rotor of claim 15 wherein said armature core disk laminations define a plurality of apertures for receiving said tie rods.

17. The rotor of claim 16 wherein said short circuiting rings each define a plurality of ring apertures for receiving said tie rods, said ring apertures each having a diameter that is slightly greater than the diameter of said tie rods.

18. The rotor of clam 15 wherein said tie rods have oppositely disposed ends, and wherein said rotor further comprises cap means located to cover said ends of said tie rods.

19. The rotor of claim 18 wherein said shaft ends are comprised of a material selected from the group consisting of one of a non-magnetic material, a material which cannot be oxidized and a ceramic material.

* * * * *